May 3, 1927.
E. WIRTH
1,627,071
ABSORPTION REFRIGERATING MACHINE
Filed March 31, 1924
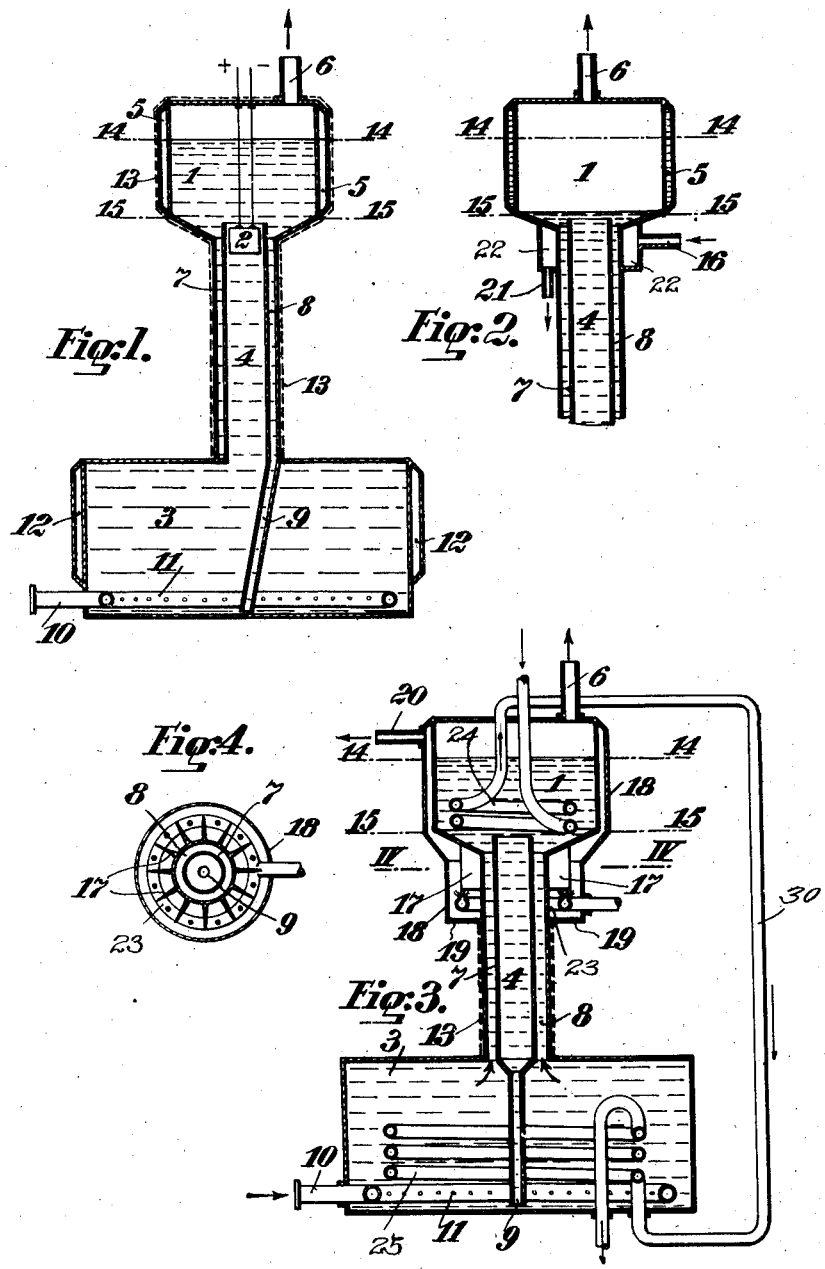

Patented May 3, 1927.

1,627,071

UNITED STATES PATENT OFFICE.

ELIAS WIRTH, OF WINTERTHUR, SWITZERLAND, ASSIGNOR TO SULZER FRÈRES SOCIÉTÉ ANONYME, OF WINTERTHUR, SWITZERLAND, A CORPORATION OF SWITZERLAND.

ABSORPTION REFRIGERATING MACHINE.

Application filed March 31, 1924, Serial No. 703,078, and in Germany July 17, 1923.

This invention relates to intermittently operating absorption refrigerating machines in which the refrigerant in the form of a gas is expelled from a solution contained in a heated compartment known as a generator, passed through a condenser and an evaporator, and returned to the solution contained in another compartment, known as an absorber, in connection with the first.

Constructions of absorption refrigerating machines are known in which the generator and the absorber have been combined together, but such an arrangement is subject to the disadvantage that the whole quantity of solution is heated, unless special means are provided for subdividing the solution. In this latter case it sometimes happens during the expulsion period that the cold solution comes into contact with the expelled gases and there is then the consequent opportunity of re-absorption of the gas.

The present invention has for its object the avoidance of these difficulties attendant upon a combined generator and absorber. Accordingly, I have constructed a double compartment container in which one compartment serves as a generator and the other as an absorber in such a manner that the solution contained in the generator compartment and that contained in the absorber are so disposed to one another that only a warm solution comes into contact with the expelled gases, thus eliminating the danger of re-absorption of the expelled gases.

More particularly, I dispose the compartment adapted to serve as a generator above that adapted to serve as an absorber and connect them by restricted passage of considerably lesser cross section than either compartment. I form this restricted passage or connection in such a manner that as the solution circulates between absorber compartment and generator compartment, due to the difference in specific gravities of the concentrated solution in the generator and the weak solution in the absorber, an exchange of heat occurs.

As an aid in starting the absorption or in dissipating the heat generated by the absorption I may arrange cooling devices in either the generator compartment or the absorber compartment or in both. In addition I may leave the absorber compartment uncovered so as to be air cooled and insulate the generator compartment to prevent heat loss.

The invention is illustrated diagrammatically in the accompanying drawings wherein:

Figure 1 shows one arrangement in vertical section.

Figure 2 shows a similar view of a modification of the arrangement shown in Figure 1.

Figure 3 shows another arrangement.

Figure 4 shows a horizontal section on the line IV—IV of Figure 3.

In the construction shown in Figure 1, the container consists of a generator compartment 1 provided with an electric heater 2, and an absorption compartment 3 disposed at a lower level than the generator compartment 1, the two compartments being connected together by the restricted passage 4. The generator compartment 1, which is connected to a condenser (not shown) through a pipe 6, is provided with a cooling device 5. The restricted passage 4 consists of a pipe 7 surrounded by an annular chamber 8 which opens near the bottom of the absorber compartment 3 by means of a pipe 9. The gaseous refrigerant coming from the evaporator (not shown) passes through the tube 10 and the annular perforated pipe 11 into the absorber compartment 3, which is provided with a cooling device 12 in the form of a cooling jacket.

Figure 2 shows an arrangement in which steam is employed for heating the generator compartment. In this construction the steam is supplied through a pipe 16 to the heating chamber 22 which is disposed at the upper end of the restricted passage 4, the condensate escaping through a pipe 17. The cooling medium which passes through the cooling device 5 may also be caused to pass through the heating chamber 22 if desired.

Another arrangement is shown in Figure 3 in which gas or oil heating is employed. The heat in this arrangement is transmitted from an annular burner 23 to the heating surface which is provided with ribs 17. A jacket 18, which is provided with adjustable slots 19 surrounds the heating device and is continued upwards in the form of a jacket for the generator compartment 1. The burnt gases escape through an outlet 20. In this construction the cooling devices 24 and 25 are in the form of coiled pipes. If the same cooling medium is used in both cooling devices, it is preferable to admit it first to the device 24 and then through pipe 30 to the other cooling device 25 in the apparatus. In this construction as also in the construction shown in Figure 2 the pipe 9 from the restricted passage 4 is connected to the pipe 7 instead of to the annular chamber 8.

The machine operates in the following manner. When the machine is ready for starting, the surface of the solution in the generator compartment is at the level shown by the line 14—14. During heating this level will fall to the level 15—15, the arrangement being such that heating device lies below the level of the surface 15—15. The gases which are expelled from the solution pass through the pipe 6 to the condenser, the level of the surface of contact between the solution and the expelled gases remaining at 15—15 during the normal operation of the machine. As the gases are expelled by heat from the upper layers of the solution, the specific gravity of these layers increases and they fall through the pipe 7 of the restricted passage 4 (Figs. 2 and 3) and the pipe 9 into the lowest part of the absorption compartment 3. The cold and highly concentrated solution in the absorption compartment, on the other hand, flows upward through the annular chamber 8 of the restricted passage 4 (Figs. 2 and 3) towards the heating device. On its way upward this solution becomes partially heated by contact with the walls of the pipe 7 carrying the hot solution downward. The restricted passage 4 therefore produces an exchange of heat since the heat of the weak solution, passing down from the generator compartment 6 into the absorption compartment is thus utilized to pre-heat the rising concentrated solution.

For starting the absorption it is important that the solution in the generator compartment be brought quickly to the absorption pressure. This is effected, after the supply of heat is cut off by rapidly cooling that part of the solution which is in contact with the expelled gases, by means of the cooling device arranged in the generator compartment. At the same time the liquid in the absorption compartment is cooled by its cooling device, thus dissipating the heat resulting from the absorption of the gases entering through the pipe 10. It is important that the contents of the absorption compartment remain cool during the absorption period and it is therefore not insulated, so that in additiion to the cooling device arranged in the interior the cooling effect is intensified by the action of the air.

It will be understood that the various arrangements of heating devices and cooling devices are only given by way of example and that other arrangements may be employed. Again the invention is not restricted to the particular arrangement of the generator compartment, absorption compartment and the restricted passage which have been described and illustrated, but other means may be employed for the purpose of preventing cool solution from coming into contact with the expelled gases during operation. Further the starting up may be facilitated by producing a mechanical circulation of the solution instead of by means of the cooling device described, or alternatively by a combination of cooling and circulating devices.

I claim:

1. In an absorption refrigerating machine, a container comprising an upper and a lower closed compartment in restricted connection, means for heating said upper compartment, means for cooling said upper compartment, means for leading off the expelled gases from said upper compartment, means for introducing the returning gases into said lower compartment, said restricted connection being subdivided into passages, the walls of which are adapted to produce an exchange of heat between the liquid flowing into the lower compartment and the liquid flowing into the upper compartment.

2. In an absorption refrigerating machine, a container comprising an upper and a lower closed compartment in restricted connection, means for heating said upper compartment, means for leading off the expelled gases from said upper compartment, means for introducing the returning gases into said lower compartment and means for cooling said lower compartment, said restricted connection being subdivided into passages, the walls of which are adapted for the heat exchange between the liquid flowing into the lower compartment and the liquid flowing into the upper compartment.

3. In an absorption refrigerating machine, a container comprising an upper and a lower closed compartment in restricted connection, means for heating said upper compartment, means for cooling said upper compartment, means for leading off the expelled gases from said upper compartment, means for introducing the returning gases into said lower compartment, and means for cooling said lower compartment, said restricted connection being subdivided into passages, the walls of which are adapted to produce an exchange of heat between the liquid flowing into the lower compartment and the liquid flowing into the upper compartment.

4. In an absorption refrigerating machine, a container comprising an upper and a lower closed compartment in restricted connection, means for heating said upper compartment, means for cooling said upper compartment, means for leading off the expelled gases from said upper compartment, means for introducing the returning gases into said lower compartment, means for cooling said lower compartment, and means to direct the flow of the cooling medium first through the cooling device of the upper compartment and then through the cooling device of the lower compartment, said restricted connection being subdivided into passages, the walls of which are adapted to produce an exchange of heat between the liquid flowing into the lower compartment and the liquid flowing into the upper compartment.

In testimony whereof I have affixed my signature.

ELIAS WIRTH.